United States Patent
Seki

(10) Patent No.: US 12,277,008 B2
(45) Date of Patent: Apr. 15, 2025

(54) DISPLAY DEVICE

(71) Applicant: JOLED INC., Tokyo (JP)

(72) Inventor: Takahiro Seki, Tokyo (JP)

(73) Assignee: JOLED INC., Tokyo (JP)

( * ) Notice: Subject to any disclaimer, the term of this patent is extended or adjusted under 35 U.S.C. 154(b) by 243 days.

(21) Appl. No.: 17/807,377

(22) Filed: Jun. 16, 2022

(65) Prior Publication Data
US 2022/0404873 A1 Dec. 22, 2022

(30) Foreign Application Priority Data
Jun. 18, 2021 (JP) .................... 2021-101502

(51) Int. Cl.
*G06F 1/16* (2006.01)

(52) U.S. Cl.
CPC .......... *G06F 1/1652* (2013.01); *G06F 1/1637* (2013.01)

(58) Field of Classification Search
CPC ........ G09F 9/301; G09F 9/335; G06F 1/1652; G06F 1/1637
See application file for complete search history.

(56) References Cited

U.S. PATENT DOCUMENTS

| | | | |
|---|---|---|---|
| 10,001,809 B2 | 6/2018 | Seo et al. | |
| 10,410,549 B1 | 9/2019 | Kim et al. | |
| 10,481,640 B2 | 11/2019 | Kim et al. | |
| 10,602,623 B1 | 3/2020 | Myers | |
| 2007/0180745 A1 | 8/2007 | Ofuji et al. | |
| 2007/0188986 A1 | 8/2007 | Kobayashi | |
| 2017/0013705 A1 * | 1/2017 | Jahng | G09F 9/301 |
| 2017/0156219 A1 | 6/2017 | Heo et al. | |
| 2017/0278436 A1 | 9/2017 | Chu | |
| 2017/0364122 A1 | 12/2017 | Kim et al. | |
| 2018/0375054 A1 | 12/2018 | Wang et al. | |
| 2019/0098774 A1 * | 3/2019 | Park | G09F 9/301 |
| 2019/0166696 A1 | 5/2019 | Lin et al. | |
| 2019/0289721 A1 | 9/2019 | Lin et al. | |
| 2019/0371214 A1 | 12/2019 | Kim et al. | |
| 2019/0371505 A1 * | 12/2019 | Lin | G09F 9/301 |
| 2020/0043386 A1 | 2/2020 | Kim | |
| 2020/0143719 A1 | 5/2020 | Kim | |
| 2020/0159288 A1 | 5/2020 | Song et al. | |
| 2020/0266383 A1 | 8/2020 | Li | |
| 2021/0056874 A1 * | 2/2021 | Morin | G06F 1/1601 |
| 2024/0096244 A1 * | 3/2024 | Togashi | G06F 1/1652 |

FOREIGN PATENT DOCUMENTS

| | | | | |
|---|---|---|---|---|
| EP | 3557370 A1 * | 10/2019 | .......... | G06F 1/1601 |
| JP | 2005249828 A | 9/2005 | | |
| JP | 3962418 B2 | 8/2007 | | |
| JP | 2011008054 A | 1/2011 | | |

OTHER PUBLICATIONS

Office Action for Japanese patent application No. 2021-101502, issued on May 23, 2023, 2 pages of Office Action.

* cited by examiner

*Primary Examiner* — Sagar Shrestha
*Assistant Examiner* — Peter Krim
(74) *Attorney, Agent, or Firm* — CHIP Law Group

(57) ABSTRACT

Provided is a display device including a panel member that has a display panel and a magnetic member adhering to a back surface of the display panel and that is capable of being rolled up, and a magnet that is positioned on a side, opposite to the display panel, of the magnetic member and attracts the magnetic member, in a state where the panel member is drawn out.

5 Claims, 5 Drawing Sheets

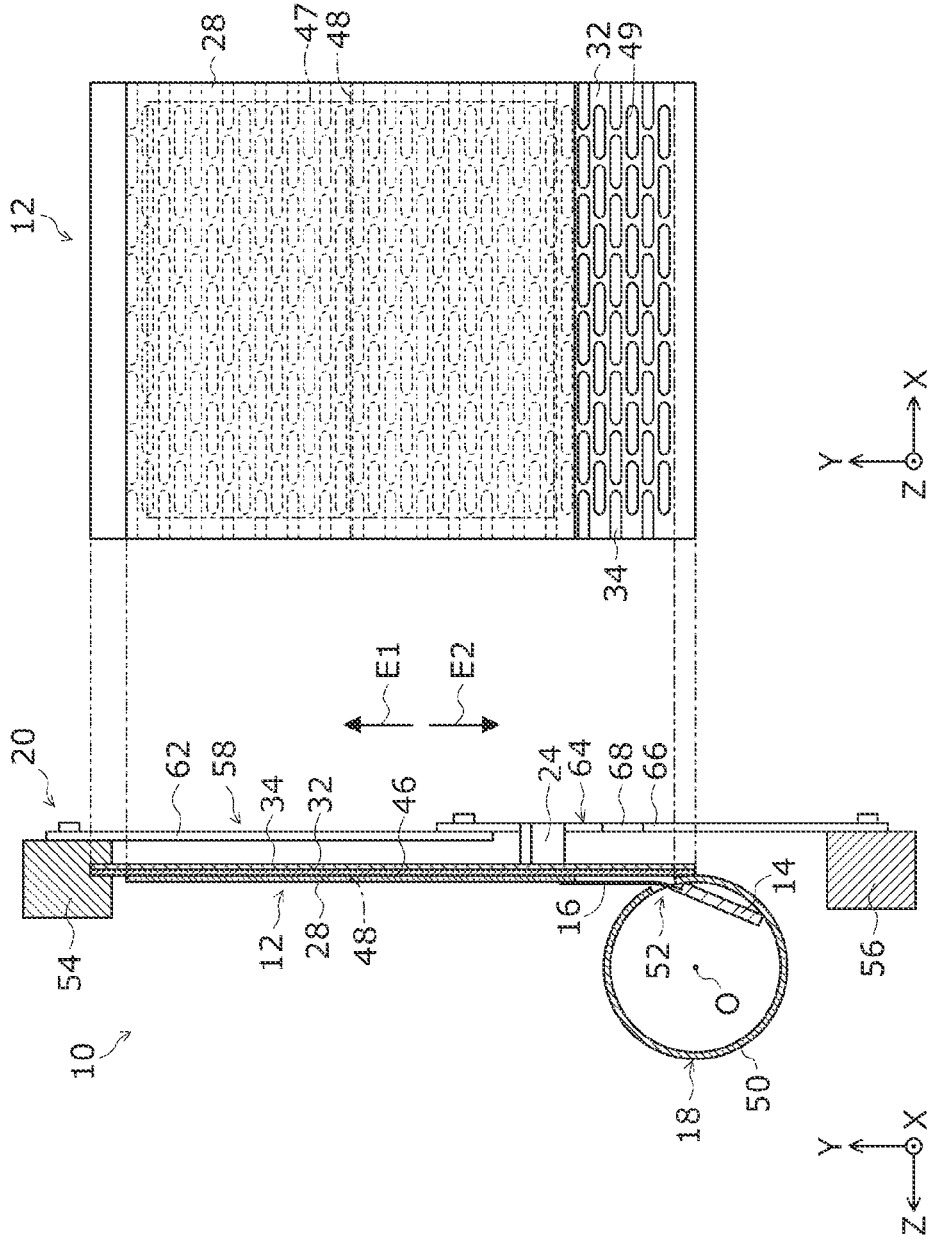

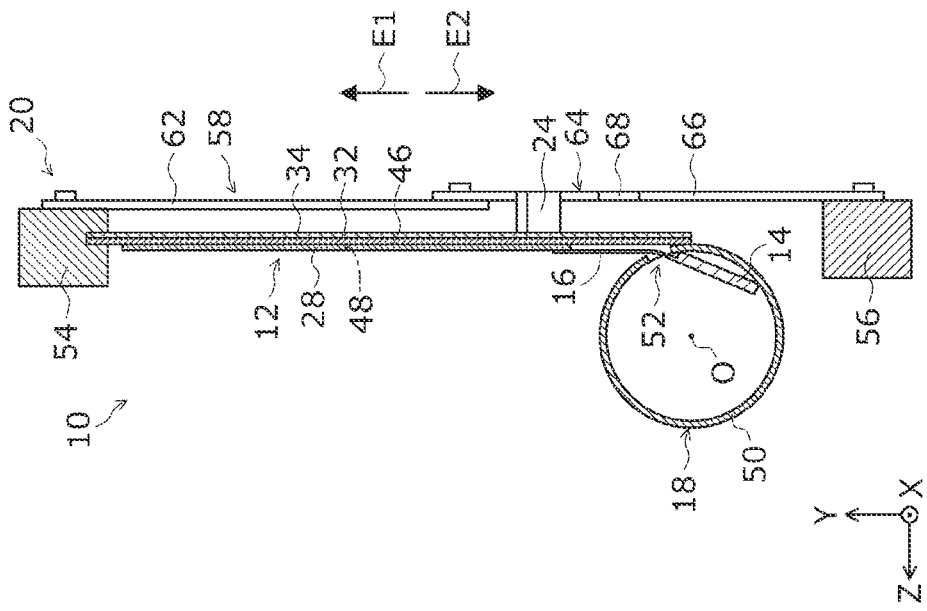
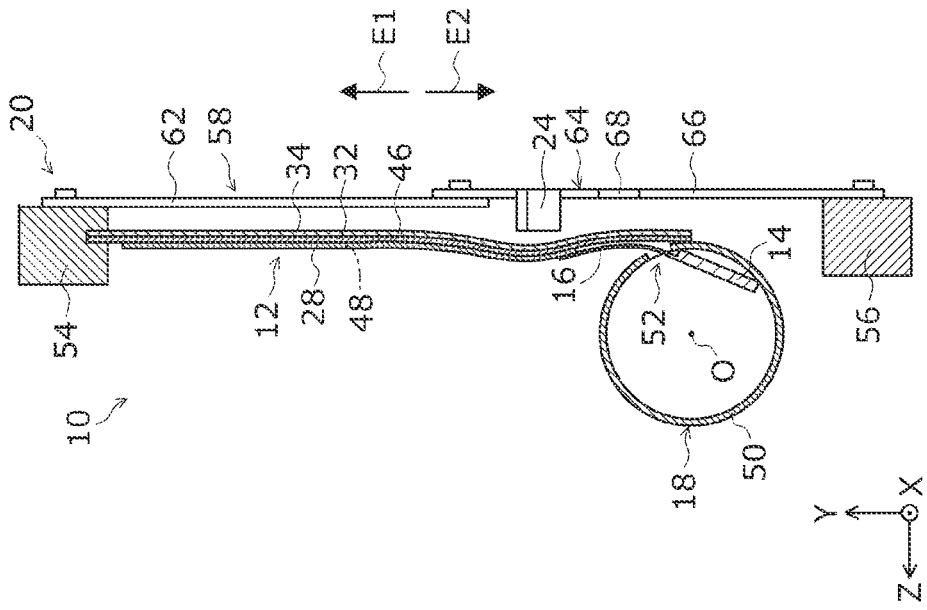

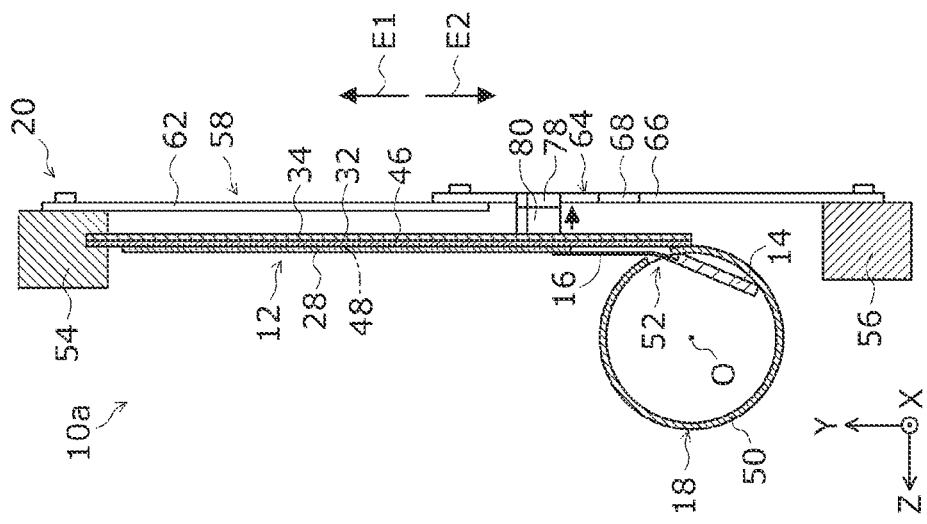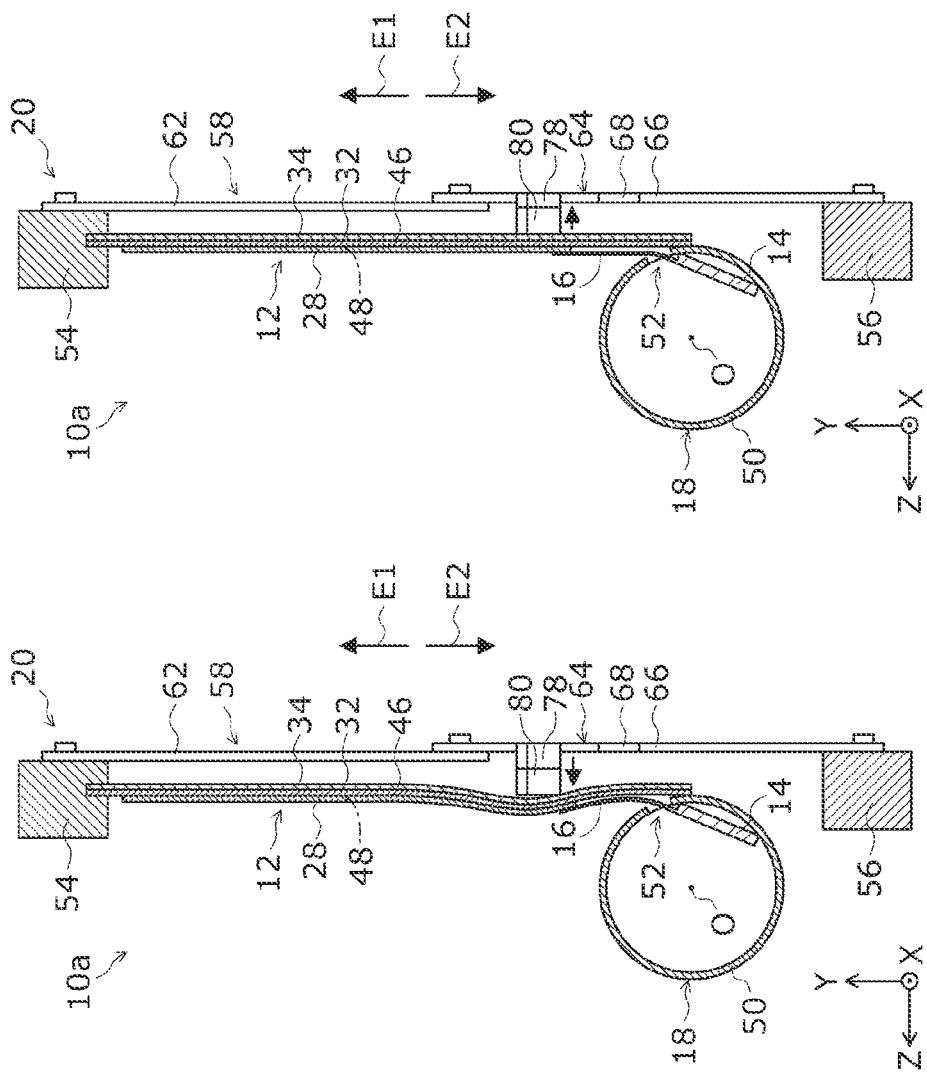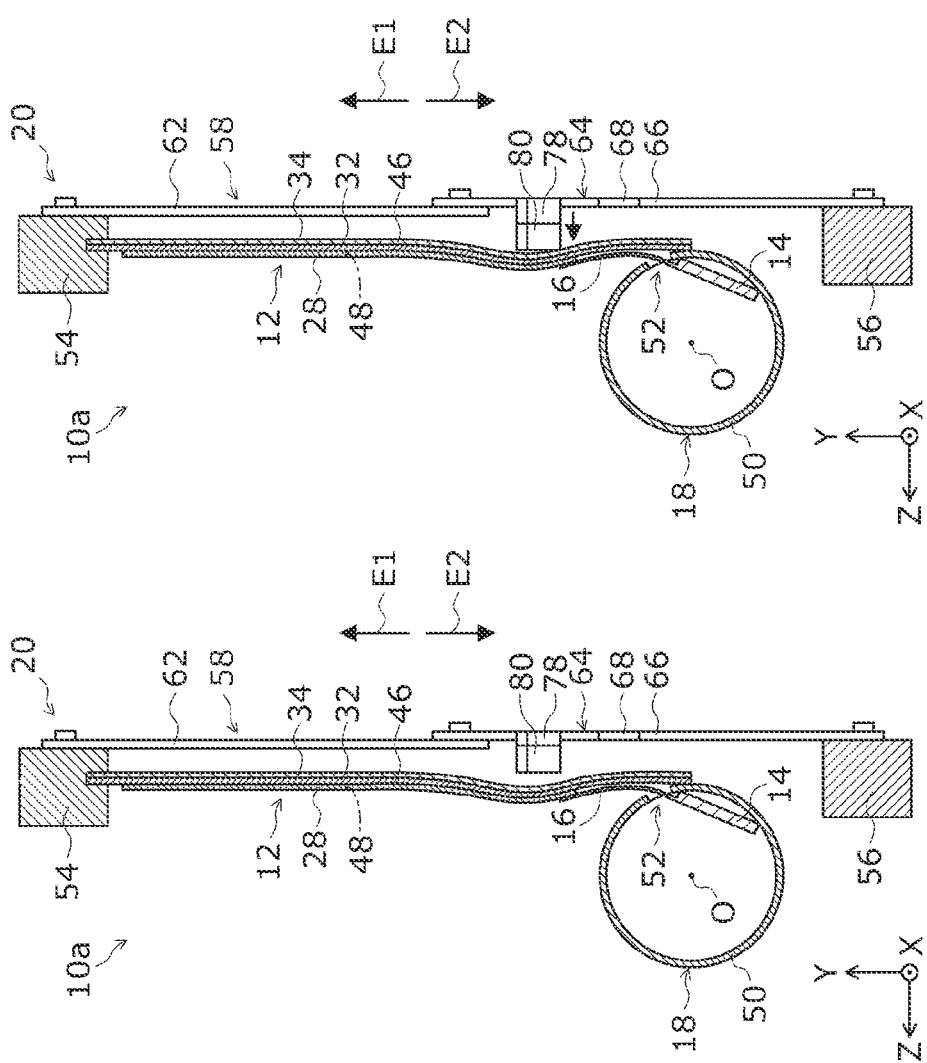

DISPLAY DEVICE

BACKGROUND

The present disclosure relates to a display device, and particularly to a display device including a display panel having flexibility.

A display device including a display panel having flexibility has been known from the past. As an example of the display device of this type, U.S. patent Ser. No. 10/001,809 discloses a flexible display device including a display having flexibility.

SUMMARY

However, in the flexible display device of U.S. patent Ser. No. 10/001,809, in the case where the display is curled by being rolled up, for example, there is a problem that the display panel is curved in a state where the display panel is drawn out. In order to suppress the display panel from being curved, the display may be drawn strongly in the draw-out direction, but there is a problem that, when the display is drawn strongly in the draw-out direction, the display is likely to be damaged.

It is desirable to provide a display device capable of suppressing a display panel from being curved in a state where the display panel is drawn out while suppressing the display panel from being damaged.

According to an embodiment of the present disclosure, a display device includes a panel member that has a display panel and a magnetic member adhering to a back surface of the display panel and that is capable of being rolled up, and a magnet that is positioned on a side, opposite to the display panel, of the magnetic member and attracts the magnetic member, in a state where the panel member is drawn out.

According to an embodiment of the present disclosure, it is possible to provide a display device capable of suppressing a display panel from being curved in a state where the display panel is drawn out while suppressing the display panel from being damaged.

BRIEF DESCRIPTION OF THE DRAWINGS

FIG. 2A and FIG. 2B are diagrams for illustrating a cross section of the display device and a panel member illustrated in FIG. 1A and FIG. 1B;

FIG. 4A and FIG. 4B are diagrams each explaining an example of an operation of the display device illustrated in FIG. 1A and FIG. 1B; and FIG. 5A to FIG. 5C are cross-sectional views each illustrating a display device according to a second embodiment.

DETAILED DESCRIPTION OF THE PREFERRED EMBODIMENTS

Figure 1A:
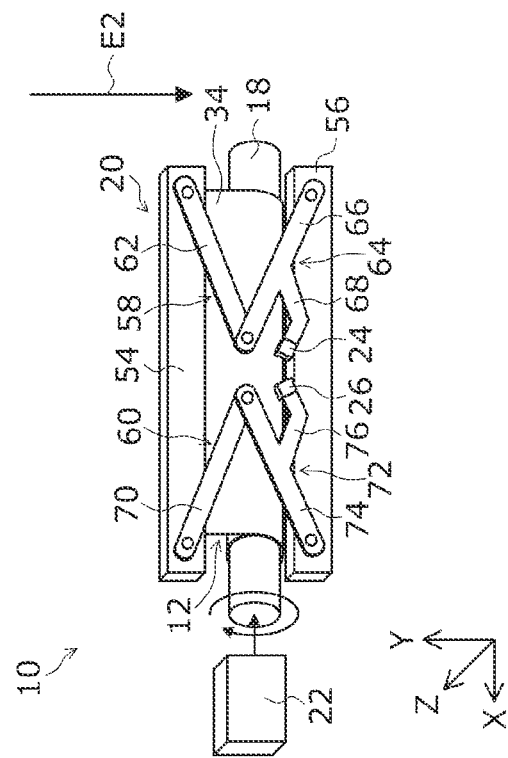
FIG. 1A and FIG. 1B are perspective views each illustrating a display device according to a first embodiment.

Hereinafter, a display device according to embodiments of the present disclosure will be described with reference to the drawings. It should be noted that each of the embodiments described below illustrates a specific example of the present disclosure. Thus, the numerical values, the constitutional elements, the arrangement positions and connection configurations of the constitutional elements, and other details illustrated in the following embodiments are mere examples, and are not intended to limit the present disclosure. Therefore, among the constitutional elements described in the following embodiments, those not described in the independent claim are described as optional constitutional elements.

In each drawing, substantially the same constitutional elements are denoted by the same reference numerals. In addition, each drawing is a schematic diagram, and the ratio of the sizes of respective parts, for example, are not necessarily illustrated accurately.

First Embodiment

Figure 1B:
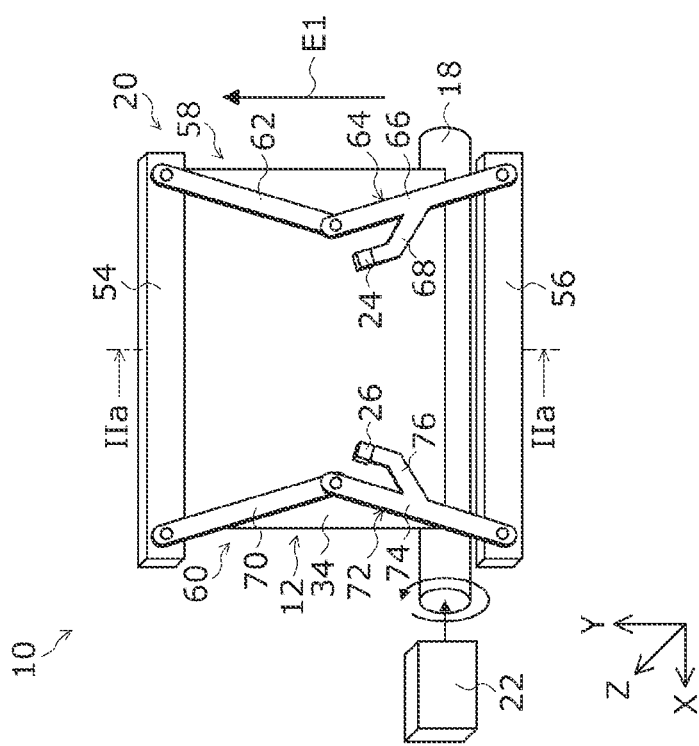
Figure 3:
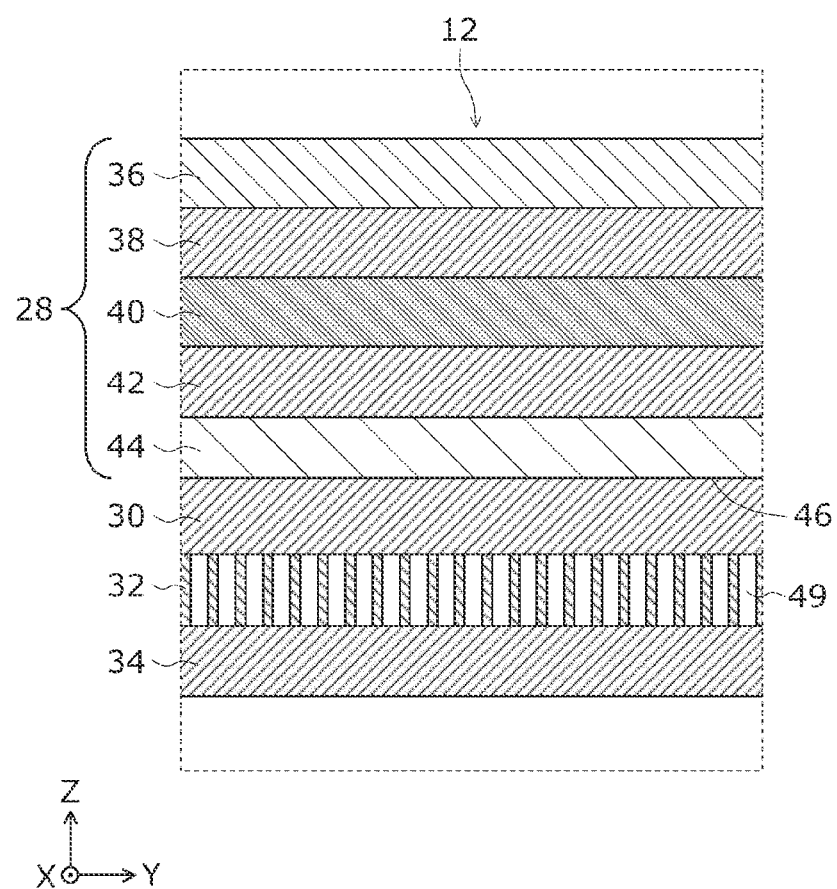
FIG. 3 is a cross-sectional view for illustrating a part of the panel member of the display device illustrated in FIG. 1A and FIG. 1B.

FIG. 1A and FIG. 1B are perspective views each illustrating a display device 10 according to a first embodiment. FIG. 1A illustrates a state in which a panel member 12 is drawn out, and FIG. 1B illustrates a state in which the panel member 12 is rolled up. FIG. 2A and FIG. 2B are diagrams for illustrating a cross section of the display device 10 and the panel member 12 illustrated in FIG. 1A and FIG. 1B. FIG. 2A illustrates a cross section of the display device 10, and FIG. 2B illustrates the panel member 12. FIG. 2A illustrates a cross section taken along line IIa-IIa in FIG. 1A and FIG. 1B. FIG. 3 is a cross-sectional view for illustrating a part of the panel member 12 of the display device 10 illustrated in FIG. 1A and FIG. 1B. It should be noted that in FIG. 2A, an optical adhesive sheet 30, a plurality of through holes 49, and other components are not illustrated in order to avoid complicated drawing. The same applies to FIG. 4A and FIG. 4B and FIG. 5A to FIG. 5C.

As illustrated in FIG. 1A to FIG. 3, the display device 10 is a device for displaying an image, for example, and includes the panel member 12, a driving substrate 14, a flexible substrate 16, a core member 18, a pantograph part 20, a motor 22, and a plurality of magnets 24 and 26. The display device 10 is a rollable display device capable of rolling up the panel member 12 and drawing out the rolled panel member 12. For example, the display device 10 is used in a tablet terminal, a digital television, a digital signage, a smartphone, a wearable terminal, or other apparatuses.

The panel member 12 has flexibility and can be rolled up. The panel member 12 is a plate-like member extending in a first direction and a second direction orthogonal to the first direction in a draw-out state. The first direction is a direction indicated by an X-axis in FIG. 1A to FIG. 5C, and the second direction is a direction indicated by a Y-axis in FIG. 1A to FIG. 5C. The panel member 12 has a display panel 28, an optical adhesive sheet 30, a magnetic member 32, and a protective member 34.

The display panel 28 is a panel for displaying an image, for example. The display panel 28 has flexibility. The display panel 28 is what is generally called a flexible display panel. The display panel 28 is a plate-like member extending in the first direction and the second direction in a state where the panel member 12 is drawn out. In the embodiment, in a state where the panel member 12 is drawn out, the display panel 28 has a rectangular shape in which the first direction is the long-side direction and the second direction is the short-side direction and a plate-like shape in which a third direction orthogonal to the first direction and the second direction is a thickness direction, and displays an image toward one side (the positive side in a Z-axis direction) of the third direction. The third direction is a direction indicated by a Z-axis in FIG. 1A to FIG. 5C.

It should be noted that, for example, the display panel 28 may have a rectangular shape in which the first direction is the short-side direction and the second direction is the long-side direction, or may have a square shape, another polygonal shape, a circular shape, an elliptical shape, or other shapes in a state where the panel member 12 is drawn out.

The display panel 28 has a cover window 36, an optical adhesive sheet 38, a circular polarization plate 40, an optical adhesive sheet 42, and an organic light emitting diode (OLED) panel 44.

The cover window 36, the optical adhesive sheet 38, the circular polarization plate 40, the optical adhesive sheet 42, and the OLED panel 44 are laminated in the thickness direction of the display panel 28 in this order. The thickness direction of the display panel 28 coincides with the thickness direction of the optical adhesive sheet 30, the thickness direction of the magnetic member 32, and the thickness direction of the protective member 34.

The cover window 36 is bonded to the circular polarization plate 40 via the optical adhesive sheet 38, and the circular polarization plate 40 is bonded to the OLED panel 44 via the optical adhesive sheet 42. For example, the OLED panel 44 is configured by lamination of a thin film transistor (TFT), an OLED having an organic electroluminescence (EL) element, and thin film encapsulation (TFE).

The optical adhesive sheet 30 is stuck to a back surface 46 of the display panel 28 and laminated on the display panel 28. In the embodiment, the optical adhesive sheet 30 is stuck to the entire back surface 46 of the display panel 28. In the embodiment, the back surface 46 is the back surface of the OLED panel 44. For example, an acrylic, silicon, epoxy, or rubber adhesive can be used as the optical adhesive sheet 30.

The magnetic member 32 is a ferromagnetic material attracted to a magnet. For example, the magnetic member 32 is formed using a metal or other materials having a large elastic region such as stainless steel (SUS) 430 of ferritic stainless steel, or SUS 304 or SUS 301 of austenitic stainless steel having a magnetic property by cold rolling. The magnetic member 32 adheres to the back surface 46 of the display panel 28. In the embodiment, the magnetic member 32 is bonded to the back surface 46 of the display panel 28 via the optical adhesive sheet 30, so that the magnetic member 32 adheres to the back surface 46 of the display panel 28 via the optical adhesive sheet 30.

The magnetic member 32 has a plate-like shape and is laminated on the display panel 28. The magnetic member 32 has a plate-like shape extending in the first direction and the second direction in a state where the panel member 12 is drawn out. In the embodiment, in a state where the panel member 12 is drawn out, the magnetic member 32 has a rectangular shape in which the first direction is the short-side direction and the second direction is the long-side direction and a plate-like shape in which the third direction is the thickness direction, and overlaps an image display region 47 of the display panel 28 when viewed from the third direction.

It should be noted that, for example, the magnetic member 32 may have a rectangular shape in which the first direction is the long-side direction and the second direction is the short-side direction, or may have a square shape, another polygonal shape, a circular shape, an elliptical shape, or other shapes, in a state where the panel member 12 is drawn out. The same applies to the protective member 34 and other components.

The magnetic member 32 protrudes forward of the display panel 28 in the roll-up direction (see arrows E2 in FIG. 1B and FIG. 2A) in which the panel member 12 is rolled up. The roll-up direction is a direction in which the panel member 12 moves when being rolled up around the core member 18. The front end of the magnetic member 32 in the roll-up direction is fixed to the outer peripheral surface of the core member 18, and the magnetic member 32 couples the display panel 28 and the core member 18 to each other. That is, the magnetic member 32 connects the display panel 28 and the core member 18 to each other via the magnetic member 32 such that they are not separated from each other.

The magnetic member 32 protrudes forward of the display panel 28 in the draw-out direction (see arrows E1 in FIG. 1A and FIG. 2A) in which the panel member 12 is drawn out. The draw-out direction is a direction in which the panel member 12 moves when being drawn out from the core member 18, and is a direction opposite to the roll-up direction. The front end of the magnetic member 32 in the draw-out direction is fixed to a first attachment member 54 of the pantograph part 20.

The magnetic member 32 adheres to the back surface 46 on the forward side with respect to a center 48 of the display panel 28 in the roll-up direction. That is, in a state where the panel member 12 is drawn out, the magnetic member 32 overlaps a portion of the display panel 28 on a forward side with respect to the center 48 in the roll-up direction when viewed from the third direction. In the embodiment, the magnetic member 32 adheres to the back surface 46 even on a backward side with respect to the center 48 of the display panel 28 in the roll-up direction.

It should be noted that, for example, the magnetic member 32 may adhere to the back surface 46 only on the forward side with respect to the center 48 of the display panel 28 in the roll-up direction, or may adhere to the back surface 46 only on the backward side with respect to the center 48 of the display panel 28 in the roll-up direction.

The magnetic member 32 is higher in rigidity than the display panel 28, and is a reinforcing member for assisting the flatness of the display panel 28 in a state where the panel member 12 is drawn out. It should be noted that, for example, the magnetic member 32 may be lower in rigidity than the display panel 28.

A plurality of through holes 49 are formed in the magnetic member 32. The plurality of through holes 49 are arranged in a zigzag manner. Some of the plurality of through holes 49 overlap the image display region 47 when viewed from the third direction in a state where the panel member 12 is drawn out. Each of the plurality of through holes 49 penetrates the magnetic member 32 in the thickness direction of the magnetic member 32 and has an oval shape. For example, the plurality of through holes 49 are formed by wet etching or other methods.

It should be noted that, for example, the plurality of through holes 49 may not be formed in the magnetic member 32, or a plurality of recessed portions may be formed in place of the plurality of through holes 49.

The protective member 34 is a back cover for, for example, suppressing the front surface of the panel member 12 from being damaged when the panel member 12 is rolled up. For example, the protective member 34 is made of urethane, silicon, nylon 66, Kevlar, or other materials.

The protective member 34 adheres to the back surface of the magnetic member 32. In the embodiment, the protective member 34 has an adhesive property and adheres to the back surface of the magnetic member 32 by being bonded to the back surface of the magnetic member 32. It should be noted that, for example, the protective member 34 may not have an adhesive property and may be bonded to the magnetic member 32 via an adhesive or other agents.

The protective member 34 has a plate-like shape and is laminated on the magnetic member 32. The protective member 34 has a plate-like shape extending in the first direction and the second direction in a state where the panel member 12 is drawn out. In the embodiment, in a state where the panel member 12 is drawn out, the protective member 34 has a rectangular shape in which the first direction is the short-side direction and the second direction is the long-side direction and a plate-like shape in which the third direction is the thickness direction, and overlaps the image display region 47 when viewed from the third direction.

The driving substrate 14 is a substrate for driving the display panel 28, and is electrically connected to the display panel 28 via the flexible substrate 16. The driving substrate 14 has a circuit for driving the display panel 28. The driving substrate 14 is provided in front of the display panel 28 in the roll-up direction, and is fixed to a main body 50 of the core member 18 inside the main body 50. For example, the driving substrate 14 is a printed circuit board (PCB).

The flexible substrate 16 is a substrate for electrically connecting the display panel 28 and the driving substrate 14 to each other, and has flexibility. The flexible substrate 16 is connected to the display panel 28 and the driving substrate 14, and couples the display panel 28 and the driving substrate 14 to each other. That is, the flexible substrate 16 connects the display panel 28 and the driving substrate 14 to each other via the flexible substrate 16 such that they are not separated from each other.

The flexible substrate 16 is connected to the front end of the OLED panel 44 in the roll-up direction, and protrudes forward of the OLED panel 44 in the roll-up direction. The front end of the flexible substrate 16 in the roll-up direction is connected to the driving substrate 14. It should be noted that the flexible substrate 16 may not be directly connected to the display panel 28 and the driving substrate 14, and may be indirectly connected to the display panel 28 and the driving substrate 14 via, for example, another member or component. For example, the flexible substrate 16 is a chip-on-film (COF).

The core member 18 is a roller to which the driving substrate 14 and the panel member 12 are fixed and which rolls up the panel member 12. Specifically, the core member 18 is a member around which the panel member 12 is rolled when the panel member 12 is rolled up. The core member 18 has the main body 50 and a penetrating part 52.

The main body 50 has a substantially cylindrical shape in which the first direction is the axial direction, and the front end of the panel member 12 in the roll-up direction is fixed to the outer peripheral surface of the main body 50. In the embodiment, the front end of the magnetic member 32 in the roll-up direction is fixed to the outer peripheral surface of the main body 50. The penetrating part 52 penetrates the main body 50 in the radial direction of the main body 50 and extends in the axial direction of the main body 50. The flexible substrate 16 is inserted into the penetrating part 52.

The pantograph part 20 has a first attachment member 54, a second attachment member 56, a first arm member 58, and a second arm member 60.

The first attachment member 54 is attached to the front end of the panel member 12 in the draw-out direction. In the embodiment, the first attachment member 54 is attached to the front end of the panel member 12 in the draw-out direction by sandwiching the front end of the magnetic member 32 and the front end of the protective member 34 in the draw-out direction. The first attachment member 54 extends in the first direction along the front end of the panel member 12 in the draw-out direction.

The second attachment member 56 faces the first attachment member 54 in the second direction and extends in the first direction. The second attachment member 56 is fixed to a member (not illustrated) for supporting the core member 18 in a rotatable manner.

The first arm member 58 is provided on the back surface 46 side of the display panel 28 and expands and contracts in the second direction. The first arm member 58 has a plurality of link members 62 and 64. Each of the plurality of link members 62 and 64 rotates on the back surface 46 side of the display panel 28 to push out the first attachment member 54 in the draw-out direction.

The link member 62 has an elongated shape, one end of the link member 62 is attached to the first attachment member 54 in a manner rotatable about the third direction, and the other end of the link member 62 is attached to the link member 64 in a manner rotatable about the third direction.

The link member 64 has a main body 66 and a protrusion part 68. The main body 66 has an elongated shape, one end of the main body 66 is attached to the link member 62 in a manner rotatable about the third direction, and the other end of the main body 66 is attached to the second attachment member 56 in a manner rotatable about the third direction. The protrusion part 68 protrudes from the main body 66 to one side in the first direction (the positive side in the X-axis direction).

For example, the link member 64 is biased in a direction rotated clockwise when viewed from the other side in the third direction (the negative side in the Z-axis direction). As the link member 64 rotates, the link member 62 rotates in a direction opposite to the link member 64, and the first arm member 58 extends in the draw-out direction.

The second arm member 60 is provided on the back surface 46 side of the display panel 28 and expands and contracts in the second direction. The second arm member 60 is provided on one side of the first arm member 58 in the first direction, and is provided symmetrically with the first arm member 58. The second arm member 60 has a plurality of link members 70 and 72. Each of the plurality of link members 70 and 72 rotates on the back surface 46 side of the display panel 28 to push out the first attachment member 54 in the draw-out direction.

The link member 70 has an elongated shape, one end of the link member 70 is attached to the first attachment member 54 in a manner rotatable about the third direction, and the other end of the link member 70 is attached to the link member 72 in a manner rotatable about the third direction.

The link member 72 has a main body 74 and a protrusion part 76. The main body 74 has an elongated shape, one end of the main body 74 is attached to the link member 70 in a manner rotatable about the third direction, and the other end of the main body 74 is attached to the second attachment member 56 in a manner rotatable about the third direction. The protrusion part 76 protrudes from the main body 74 to the other side in the first direction (the negative side in the X-axis direction).

For example, the link member 72 is biased in a direction rotated counter-clockwise when viewed from the other side in the third direction. As the link member 72 rotates, the link member 70 rotates in a direction opposite to the link member 72, and the second arm member 60 extends in the draw-out direction.

Each of the first arm member 58 and the second arm member 60 is extended to move the first attachment member 54 and the second attachment member 56 in directions that separate them from each other, and the rolled panel member 12 is drawn out.

The motor 22 rotates the core member 18. When the motor 22 rotates in one direction, the core member 18 is rotated in one direction about an axis O, the first arm member 58 and the second arm member 60 are extended in the second direction, the first attachment member 54 is moved in a direction that separates from the second attachment member 56, and the panel member 12 is drawn out from the core member 18. When the motor 22 is rotated in the other direction, the core member 18 is rotated in the other direction about the axis O, the first arm member 58 and the second arm member 60 are contracted in the second direction, the first attachment member 54 is moved in a direction that approaches the second attachment member 56, and the panel member 12 is rolled up.

In a state where the panel member 12 is drawn out, each of the plurality of magnets 24 and 26 is positioned on the side, opposite to the display panel 28, of the magnetic member 32 and attracts the magnetic member 32. That is, in a state where the panel member 12 is drawn out, each of the plurality of magnets 24 and 26 overlaps the magnetic member 32 when viewed from the third direction.

In the embodiment, in a state where the panel member 12 is drawn out, each of the plurality of magnets 24 and 26 is positioned on the side, opposite to the display panel 28, of a portion of the magnetic member 32 adhering to the back surface 46 on the forward side with respect to the center 48 of the display panel 28 in the roll-up direction. That is, in a state where the panel member 12 is drawn out, each of the plurality of magnets 24 and 26 overlaps a portion of the magnetic member 32 adhering to the back surface 46 on the forward side with respect to the center 48 of the display panel 28 in the roll-up direction when viewed from the third direction.

The magnet 24 is attached to the protrusion part 68 of the link member 64 of the first arm member 58. The magnet 24 moves in association with the rotation of the link member 64. In the embodiment, the magnet 24 is an electromagnet. It should be noted that, for example, the magnet 24 may be attached to the main body 66 of the link member 64 or may be attached to the link member 62. The protrusion part 68 has such a shape that the magnet 24 can be arranged at a position where a curl can effectively be corrected and flattened at the time when the magnet 24 attracts the magnetic member 32.

The magnet 26 is attached to the protrusion part 76 of the link member 72 of the second arm member 60. The magnet 26 moves in association with the rotation of the link member 72. In the embodiment, the magnet 26 is an electromagnet. It should be noted that, for example, the magnet 26 may be attached to the main body 74 of the link member 72 or may be attached to the link member 70.

As will be described later, the magnet 24 and the magnet 26 are fixed in such a manner as not to move in the Z direction, to correct and flatten a curl of the panel member 12 formed in a projecting shape in, for example, the Z direction. That is, the link member 64 and the link member 72 to which the magnet 24 and the magnet 26 are respectively attached and the members supporting them in a rotatable manner to the second attachment member 56 have sufficient rigidity to correct the curl of the panel member 12.

FIG. 4A and FIG. 4B are diagrams each explaining an example of an operation of the display device 10 illustrated in FIG. 1A and FIG. 1B. FIG. 4A illustrates a state in which the plurality of magnets 24 and 26 do not attract the magnetic member 32, and FIG. 4B illustrates a state in which the plurality of magnets 24 and 26 attract the magnetic member 32.

As illustrated in FIG. 4A, in the case where the panel member 12 is curled, for example, by being rolled up, the panel member 12 may be curved in a state of being drawn out. For example, the magnetic member 32 adheres to the back surface 46 of a portion of the display panel 28 that is likely to be curled and curved.

For example, in a state where the panel member 12 is drawn out, a current flows through the magnet 24 to magnetize the magnet 24, and a current flows through the magnet 26 to magnetize the magnet 26. For example, in the case where a control circuit (not illustrated) detects that the panel member 12 is drawn out and the panel member 12 is actually drawn out, the magnet 24 is magnetized by a current being caused to flow through the magnet 24, and the magnet 26 is magnetized by a current being caused to flow through the magnet 26.

Accordingly, as illustrated in FIG. 4B, the magnetic member 32 is attracted to the magnet 24 and the magnet 26, a portion of the panel member 12 curved forward is drawn toward the magnet 24 side (the magnet 26 side), and the panel member 12 can be made substantially flat. It should be noted that, for example, when the panel member 12 is rolled up, the magnet 24 and the magnet 26 are not magnetized.

The display device 10 has been described above.

The display device 10 according to the first embodiment includes the panel member 12 that has the display panel 28 and the magnetic member 32 adhering to the back surface 46 of the display panel 28 and that is capable of being rolled up, and the magnet 24 that is positioned on the side, opposite to the display panel 28, of the magnetic member 32 and that attracts the magnetic member 32, in a state where the panel member 12 is drawn out.

According to this, in the case where the display panel 28 is curved forward, the magnetic member 32 adhering to the back surface 46 of the display panel 28 is attracted by the magnet 24, so that the display panel 28 can be drawn to the back surface 46 side without being drawn in the draw-out direction. Thus, it is possible to suppress the display panel 28 from being curved in a state where the display panel 28 is drawn out while suppressing the display panel 28 from being damaged.

In addition, in the display device 10 according to the first embodiment, the magnet 24 is an electromagnet.

According to this, in a state where the panel member 12 is drawn out, the magnet 24 is magnetized, so that the display panel 28 can be suppressed from being curved while also being suppressed from being damaged. In addition, the magnet 24 is not magnetized when the panel member 12 is rolled up, so that it is possible to suppress the difficulty in rolling up the panel member 12 caused by the magnetic member 32 being attracted to the magnet 24.

In addition, in the display device 10 according to the first embodiment, the magnetic member 32 has a plate-like shape, is laminated on the display panel 28, and is higher in rigidity than the display panel 28.

According to this, since the magnetic member 32 has a plate-like shape and is laminated on the display panel 28, the magnetic member 32 can easily be attracted, and the display panel 28 can easily be suppressed from being curved. In addition, since the magnetic member 32 is higher in rigidity than the display panel 28, the magnetic member 32 can further suppress the display panel 28 from being curved.

In addition, in the display device 10 according to the first embodiment, the magnetic member 32 adheres to the back surface 46 on the forward side with respect to the center 48 of the display panel 28 in the roll-up direction in which the panel member 12 is rolled up, and the magnet 24 is positioned on the side, opposite to the display panel 28, of a portion of the magnetic member 32 adhering to the back surface 46 on the forward side, in a state where the panel member 12 is drawn out.

According to this, since the magnetic member 32 can be attracted by the magnet 24 being arranged on the back surface 46 side of a portion of the display panel 28 that is likely to be curled and curved, the curvature of the display panel 28 can be further suppressed in a state where the display panel 28 is drawn out.

In addition, the display device 10 according to the first embodiment further includes the first attachment member 54 attached to the front end of the panel member 12 in the draw-out direction in which the panel member 12 is drawn out, and the link member 64 that rotates on the back surface 46 side of the panel member 12 to push out the first attachment member 54 in the draw-out direction, and the magnet 24 is attached to the link member 64.

According to this, when the panel member 12 is drawn out, the magnet 24 can easily be positioned on the side, opposite to the display panel 28, of the magnetic member 32, so that the display panel 28 can easily be suppressed from being curved.

Second Embodiment

FIG. 5A to FIG. 5C are cross-sectional views each illustrating a display device 10a according to a second embodiment. FIG. 5A illustrates a state in which the panel member 12 is drawn out, FIG. 5B illustrates a state in which a magnet 80 is moved to the magnetic member 32 side, and FIG. 5C illustrates a state in which the magnet 80 is moved to the side opposite to the magnetic member 32.

As illustrated in FIG. 5A to FIG. 5C, the display device 10a mainly differs from the display device 10 in that a moving part 78 is further provided.

In a state where the panel member 12 is drawn out, the moving part 78 moves the magnet 80 to the magnetic member 32 side and moves the magnet 80 moved to the magnetic member 32 side to the side opposite to the magnetic member 32. In the embodiment, the moving part 78 is attached to the protrusion part 68 of the link member 64. The magnet 80 is attached to the link member 64 via the moving part 78. For example, the moving part 78 is an actuator including a piezoelectric element or other elements, and electric power is supplied such that the thickness in the third direction is increased and the magnet 80 is moved to the magnetic member 32 side.

It should be noted that although not illustrated in the drawing, for example, the link member 72 is similarly provided with the moving part 78 and the magnet 80.

For example, as illustrated in FIG. 5B, in a state where the panel member 12 is drawn out, the moving part 78 is driven and the magnet 80 is moved to the magnetic member 32 side. Then, in a state where the magnet 80 is moved to the magnetic member 32 side, a current flows through the magnet 80 to magnetize the magnet 80.

As illustrated in FIG. 5C, in a state where the magnet 80 is magnetized, the moving part 78 is driven and the magnet 80 is moved to the side opposite to the magnetic member 32. Accordingly, a portion of the panel member 12 curved forward is drawn backward, and the panel member 12 can be made substantially flat.

The display device 10a has been described above.

The display device 10a according to the second embodiment further includes the moving part 78 that moves the magnet 80 to the magnetic member 32 side and moves the magnet 80 moved to the magnetic member 32 side to the side opposite to the magnetic member 32, in a state where the panel member 12 is drawn out.

According to this, since the magnet 80 can be brought closer to the magnetic member 32 by being moved to the magnetic member 32 side, the magnetic member 32 can easily be attracted by the magnet 80. In addition, by the magnet 80 moved to the magnetic member 32 side being moved to the side opposite to the magnetic member 32, the magnetic member 32 attracted to the magnet 80 can be drawn backward together with the magnet 80. Accordingly, the display panel 28 can easily be suppressed from being curved in a state where the display panel 28 is drawn out while also being suppressed from being damaged.

Other Embodiments and the Like

The display device according to embodiments of the present disclosure has been described above, but the present disclosure is not limited to the above-described embodiments. The present disclosure also includes modified examples obtained by application to the above-described embodiments various modifications that are conceived of by those skilled in the art within the scope not departing from the gist of the present disclosure and various apparatuses incorporating the display panel according to an embodiment of the present disclosure.

In the above-described embodiments, the case where the display device 10 includes the plurality of magnets 24 and 26 has been described, but the present disclosure is not limited thereto. For example, the display device may include one magnet instead of the plurality of magnets, or may include three or more magnets.

In the above-described embodiments, the case where each of the plurality of magnets 24 and 26 is an electromagnet has been described, but the present disclosure is not limited thereto. For example, the magnet may be a permanent magnet.

In the above-described embodiments, the case where the magnetic member 32 has a plate-like shape has been described, but the present disclosure is not limited thereto. For example, the magnetic member may have a rod-like shape or other shapes extending in a direction (first direction) orthogonal to the roll-up direction.

In the above-described embodiments, the case where in a state where the panel member 12 is drawn out, each of the plurality of magnets 24 and 26 is positioned on the side, opposite to the display panel 28, of a portion of the magnetic member 32 adhering to the back surface 46 on the forward side with respect to the center 48 of the display panel 28 in the roll-up direction has been described, but the present disclosure is not limited thereto. For example, in a state where the panel member is drawn out, the magnet may be positioned on the side, opposite to the display panel, of a portion of the magnetic member adhering to the back surface on the backward side with respect to the center of the display panel in the roll-up direction.

In the above-described embodiments, the case where the magnet 24 is attached to the link member 64 and the magnet 26 is attached to the link member 72 has been described, but the present disclosure is not limited thereto. For example, the display device may have a housing covering the back surface side of the panel member, and the magnet may be attached to the inner surface or another surface of the housing.

In the above-described embodiments, the case where the pantograph part 20 has the first arm member 58 and the second arm member 60 has been described, but the present disclosure is not limited thereto. For example, the pantograph part may have one arm member instead of the plurality of arm members.

In the above-described embodiments, the case where the first arm member 58 has the plurality of link members 62 and 64 and the second arm member 60 has the plurality of link members 70 and 72 has been described, but the present disclosure is not limited thereto. For example, each arm member may have one link member instead of the plurality of link members.

The display device according to an embodiment of the present disclosure can be used in a digital television, a digital signage, a smartphone, a tablet terminal, a wearable terminal, or other apparatuses.

The present disclosure contains subject matter related to that disclosed in Japanese Priority Patent Application JP 2021-101502 filed in the Japan Patent Office on Jun. 18, 2021, the entire content of which is hereby incorporated by reference.

What is claimed is:

1. A display device, comprising:
a panel member that has a display panel and a magnetic member adhering to a back surface of the display panel, wherein the panel member is capable of being rolled up;
a magnet that is positioned on a side, opposite to the display panel, of the magnetic member and attracts the magnetic member, in a state where the panel member is drawn out; and
a moving part that, in the state where the panel member is drawn out, moves the magnet in a direction toward the magnetic member and moves the magnet in a direction backward from the display panel, wherein
the movement of the magnet in the direction toward the magnetic member by the moving part brings the magnet closer to a portion of the panel member where the display panel is curved in a thickness direction of the display panel, and
the movement of the magnet in the direction backward from the display panel by the moving part flattens the display panel that is curved in the thickness direction.

2. The display device according to claim 1, wherein the magnet is an electromagnet.

3. The display device according to claim 1, wherein the magnetic member has a plate-like shape, is laminated on the display panel, and is higher in rigidity than the display panel.

4. The display device according to claim 1, wherein
the magnetic member adheres to the back surface on a forward side with respect to a center of the display panel in a roll-up direction in which the panel member is rolled up, and
the magnet is positioned on a side, opposite to the display panel, of a portion of the magnetic member adhering to the back surface on the forward side, in the state where the panel member is drawn out.

5. The display device according to claim 1, further comprising:
an attachment member that is attached to a front end of the panel member in a draw-out direction in which the panel member is drawn out; and
a link member that rotates on a side of the back surface and pushes out the attachment member in the draw-out direction,
wherein the magnet is attached to the link member.

* * * * *